United States Patent [19]
Augier et al.

[11] Patent Number: 5,601,882
[45] Date of Patent: Feb. 11, 1997

[54] PROCESS FOR MANUFACTURING CUT THREADS AND ASSOCIATED DEVICE

[75] Inventors: Eric Augier, Chambery; Timothy Johnson, Vimines; Patrick Moireau, Curienne, all of France

[73] Assignee: Vetrotex France, Chambery, France

[21] Appl. No.: 282,476

[22] Filed: Jul. 29, 1994

[30] Foreign Application Priority Data

Jul. 29, 1993 [FR] France .................................... 9309322

[51] Int. Cl.[6] ....................................... B05D 3/06
[52] U.S. Cl. ...................... 427/513; 156/275.5; 427/292; 427/346; 427/558
[58] Field of Search ..................... 427/292, 346, 427/389.8, 512, 513, 553, 558; 156/62.2, 275.5, 275.7

[56] References Cited

U.S. PATENT DOCUMENTS

| | | | |
|---|---|---|---|
| 3,869,268 | 3/1975 | Briar et al. ..................... | 65/2 |
| 4,043,779 | 8/1977 | Schaefer ......................... | 65/2 |
| 4,045,196 | 8/1977 | Schaefer ......................... | 65/2 |
| 4,477,525 | 10/1984 | Login .................................. | 422/513 X |
| 5,049,407 | 9/1991 | Soszka et al. ................... | 427/513 |
| 5,192,387 | 3/1993 | Buckley ........................... | 156/275.5 |
| 5,352,392 | 10/1994 | Johnson et al. ................. | 264/22 |

FOREIGN PATENT DOCUMENTS

| | | |
|---|---|---|
| 0243275 | 10/1987 | European Pat. Off. . |
| 0225234 | 10/1987 | European Pat. Off. . |
| 2441005 | 11/1978 | France . |
| 04037634 | 2/1992 | Japan . |
| 9205122 | 4/1992 | WIPO . |

*Primary Examiner*—Michael Lusignan
*Attorney, Agent, or Firm*—Oblon, Spivak, McClelland, Maier & Neustadt, P.C.

[57] ABSTRACT

A process and device for manufacturing cut threads according to which glass threads composed of continuous filaments are coated with a liquid non-aqueous size, which can react under the effect of actinic radiation. The threads are cut by a member which is also used to draw or entrain the threads mechanically before they are subjected to actinic radiation.

7 Claims, 3 Drawing Sheets

PROCESS FOR MANUFACTURING CUT THREADS AND ASSOCIATED DEVICE

BACKGROUND OF THE INVENTION

1. Field of the Invention

The present invention relates to a process for manufacturing cut threads from threads coated with a mixture in the liquid state which can react under the effect of actinic radiation. More specifically, the invention relates to a process for manufacturing cut threads from continuous threads intended in particular for use as reinforcements such as glass threads, said threads being composed of filaments coated with a sizing composition based on compounds which can react under the effect of actinic radiation. The present invention also relates to a device for performing this process.

2. Description of the Related Art

Cut threads are commonly used for reinforcing various matrices such as thermoplastic resins thermosetting resins, plaster, cement or paper.

It is known to manufacture these cut threads directly from one or more fiber-drawing installations in the following manner: Thin streams of molten glass flowing from the apertures in one or a plurality of die plates are drawn mechanically into filaments and are then coated in the latter form with a sizing composition before being collected into threads. The threads are then cut. The threads are mechanically drawn by the anvil wheel of the cutting member.

The size used for coating the filaments inter alia enables the filaments to be bonded to one another and the threads to be protected against abrasion, while imparting thereto the properties which are essential for the subsequent transformations. The sizes most commonly used are aqueous sizes which normally comprise of the order of 90% (weight) water. This considerable amount of water can have a harmful effect on the correct development of the process and renders necessary the provision of means for reducing the moisture content at different stages.

Before cutting, some of the water is eliminated by rubbing on the filament-assembly device. This reduction of the moisture content can, nevertheless, prove to be inadequate. Adhesion of the threads to one another can in particular occur after cutting as can adhesion of these same threads to the devices used for their collection. Means for reducing the moisture before cutting exist, in particular those described in patent WO 92/05122.

Further means exist for reducing the moisture content after cutting and before use of the cut threads for reinforcing matrices, it being possible for the water to impair the good adhesion between the glass and matrix and the ageing properties of the resultant composite. Patent FR 2 253 716 thus describes a process for manufacturing cut threads, during which process the moisture content of the threads is reduced after cutting by passing the cut threads under a series of infrared lamps or through an air-circulating oven.

However, the drying stage or stages can restrict productivity or necessitate the use of relatively heavy devices while requiring greater energy consumption.

Other processes are known for continuous threads, in particular a process in which a mixture which reacts under the effect of UV radiation is deposited on filaments during the fiber-drawing operation before these filaments are gathered together to form at least one thread, and the thread or threads is or are exposed to UV radiation during the fiber-drawing process. This process, described in patent EP-B1-243 275 makes no mention of a drying stage but requires operating with highly reactive sizing compositions in the presence of a large content of photoinitiators owing to the high fiber-drawing speed of the filaments below the die plate. In addition, the threads obtained according to this process do not easily withstand bending and tearing when being cut and problems relating to flocking or disintegration can occur in the devices performing this operation.

SUMMARY OF THE INVENTION

A first object of the present invention is to provide a novel process for manufacturing cut threads which does not have the disadvantages mentioned above.

A further object of the present invention is to provide a process for manufacturing cut threads whose characteristics are uniform over their entire length.

A final object of the present invention is to provide a device for performing the process of the invention.

These and other objects are firstly achieved by a process for manufacturing cut threads according to which glass threads composed of continuous filaments coated with a non-aqueous size, which is in the liquid state and can react under the effect of actinic radiation, are cut by a member which is also used to draw them or entrain them mechanically before being subjected to the actinic radiation.

It should be pointed out that the term "non-aqueous size" according to the invention designates a sizing composition comprising less than 10% water, the presence of water possibly being necessary in certain cases, in particular in acrylic compositions for facilitating the hydrolysis of the silanes.

The invention also concerns a device for performing the process defined above and comprising at least one cutting and fiber-drawing member on a member for cutting and entraining the sized threads as well as at least one member for receiving the cut threads, the cut threads falling simply by gravity from one member to another, and at least one source of actinic radiation directed towards one of the areas in which the cut threads drop from one member to another and/or an actinic radiation source directed to an area of a receiver member and associated with at least one blower member located below this area.

The process according to the invention has numerous advantageous features with respect to the processes mentioned above, which advantages will be made clear in the following description.

One of the principal features of the process according to the invention is the use of a non-aqueous size, defined above, which can react under the effect of actinic radiation, and to subject the threads to irradiation after cutting. The fact that a non-aqueous size is used in effect eliminates the need to dry the threads and thus enables energy saving while increasing productivity.

Moreover, the fact that irradiation is performed after cutting avoids the problems of disintegration or flocking previously encountered in the process which uses irradiation during the fiber-drawing process and before cutting. The cohesion of the filaments within the threads is preserved during the cutting process owing to the adhesive and viscous properties of the size before irradiation and the integrity of the resultant cut threads is improved.

The process according to the invention may either be a direct process or an indirect process, the choice of process used depending on the required application. The indirect process, in which the threads to be cut have come from rolls and are entrained mechanically by the cutting members, is preferably used in the case in which the amount of size to be deposited on the threads is high (greater than 5% by weight), for example for threads for reinforcing cement.

However, in most cases the process according to the invention is advantageously a direct process in which filaments formed by the drawing of thin streams of molten glass from the apertures in one or more die plates are coated with a non-aqueous size, which is in the liquid state and can react under the effect of actinic radiation, before being gathered together to form at least one thread, the thread or threads subsequently being cut by a member which in also used to draw the fibers before they are subjected to actinic radiation.

As already mentioned several times above, whether the process according to the invention is direct or indirect, the sized threads are irradiated after cutting. This irradiation can be performed at different levels, as will be explained below.

According to a first embodiment of the present invention, the cut threads are subjected to the effect of actinic radiation directly after cutting and before being collected on a receiver member.

According to one of the preferred variants of this embodiment the cut threads previously irradiated in this manner are collected on a receiver member such as a moving conveyor and, on this member, are subjected to the effect of at least a second source of actinic radiation in order to complete the crosslinking of the size.

The cut threads obtained according to the above embodiment can then be transferred to another receiver member such as a further moving conveyor.

According to a further variant of the above embodiment, in addition to the irradiation of the cut threads after they have been cut and before they are received on a first receiver member, it is also possible to irradiate the threads as they are being transferred from the first receiver member to a second receiver member, with or without intermediate irradiation.

According to a further embodiment of the invention, the cut threads are subjected to irradiation firstly on a receiver member and/or when they are transferred from one receiver member to another. Preferably, the cut threads are firstly collected on a first receiver member such as a moving conveyor and they are then subjected to actinic radiation between the first receiver member and a second receiver member which can also be a moving conveyor.

Advantageously, in all the above embodiments, the receiver member receiving the threads just after cutting is a moving conveyor subject to vibrations. The threads falling onto a conveyor of this type are thus better distributed on the conveyor and their surface is exposed more completely to possible radiation on this same conveyor. Moreover, the threads emerging from a receiver member of this type fall in the form of a screen, which arrangement enables all the cut threads to be irradiated relatively uniformly as they fall and which enables the threads to be transferred to a further receiver member in a more regular manner.

In addition, in a preferred embodiment of the invention, a blower member is located below at least part of the conveyor receiving the threads just after cutting. This blower member enables threads coated with size not yet exposed to actinic radiation to be prevented from adhering to and accumulating on the surface of the conveyor, and also permits better exposure of the threads to possible radiation on said conveyor. Preferably, the irradiation devices directed towards the receiver members according to the invention are associated with these blower members in order to prevent the threads adhering to the receiver members during irradiation, particularly in the case in which the threads have not been irradiated previously.

According to a particularly preferable embodiment of the invention, the cut threads are collected on a receiver member subject to vibrations and exposed to actinic radiation over a part of the member below which a blower member is located.

The different embodiments of the present invention, exemplified in a non-exhaustive manner in the above description, provide the advantage of greatly increasing the duration of irradiation of the sized cut threads relative to the irradiation process before cutting in the majority of cases.

The irradiation time can thus be several seconds, in particular when the irradiation process in performed on receiver members or between two receiver members. The irradiation process is thus performed at thread displacement speeds which are far slower than the fiber-drawing speeds. In this case it is unnecessary to use sizes which are particularly reactive and frequently more expensive.

Owing to this fact, the range of formulations for the size which can be used within the scope of the prevent invention is considerably enlarged, it being possible for certain reactivity products judged as being insufficient in the irradiation processes while the fibers are being drawn to now be used insofar as they are compatible with the materials to be reinforced. Likewise, owing to this wide range of formulations, the range of products which can be manufactured according to the invention is wider. In accordance with the invention it is thus possible to use monoacrylate urethane monomer-based sizing compositions which are compatible with materials of the polyamide-type or compositions based on vinyl ethers, oxirans, etc. However, it should be noted that it is not impossible in accordance with the invention to use sizing compositions based on highly reactive products, for example, in the direct processes for particularly high fiber-drawing speeds necessitating higher speeds for transferring the threads after cutting.

A further advantage of the process according to the invention is to enable photoinitiators to be used in proportions which are far smaller than those of the sizing compositions likely to react under the effect of actinic radiation used in the above-mentioned processes of irradiation before cutting if the type of irradiation used requires the presence of photoinitiators.

Thus, for direct processes, if photoinitiators are necessary and for similar fiber-drawing speeds and conversion rates, a sizing composition which can react under the effect of actinic radiation according to the process of irradiation before cutting preferably comprises between 7 and 12 weight percent of photo-initiator while the sizing composition according to the invention only contains from 2 to 5 weight percent of photo-initiator. The sizing compositions according to the invention are thus more economical.

It should further be noted that the process according to the invention enables more lightweight devices to be used. It is not necessary to provide drying means. Moreover, a plurality of cutting members can be grouped together for each transfer member, it being possible for a single source of irradiation to suffice in this case.

As explained above, the device for implementing the process according to the invention comprises at least one cutting and fiber-drawing member or a member for cutting and entraining the sized threads, a member for receiving the cut threads and a source of irradiation, the latter being located after the cutting member.

Preferably, the receiver member located below the cutting and fiber-drawing device or below the cutting and entraining device is a vibrating metal mat or band permitting better distribution and orientation of the threads and, advantageously, the receiver member or members, in particular the receiver members towards which the sources of irradiation are directed, are metal conveyors which are easy to maintain and do not risk being damaged by the radiation.

As explained above, the device according to the invention comprises at least one source of irradiation directed towards one of the areas in which the cut threads drop from one member onto another and/or a source of irradiation directed towards an area of a receiver member under which a blower member is located. If the blower member is used, the conveyor towards which it is directed is perforated, the irradiation source being protected from the gaseous currents by a silica plate, and a caisson which enables these currents to be evacuated is provided about this source.

BRIEF DESCRIPTION OF THE DRAWINGS

Preferred embodiments of the invention are illustrated below with reference to the attached drawings, in which.

DETAILED DESCRIPTION OF THE PREFERRED EMBODIMENT

It should be noted that the embodiments of the invention mentioned below are in no way limiting but illustrative.

Figure 1:
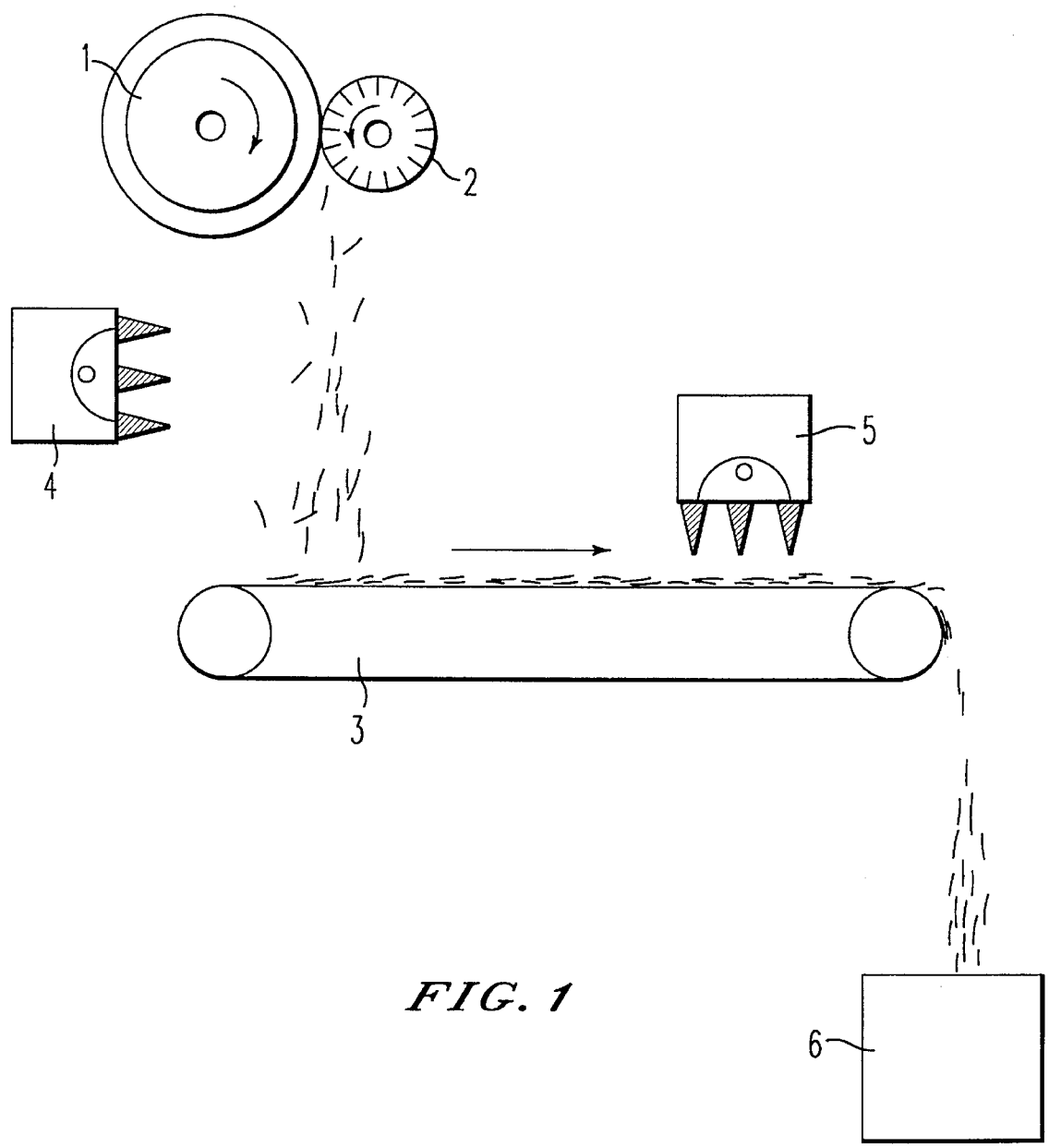
FIG. 1 is a partial, schematic view of an embodiment of the invention in which the exposure to actinic radiation is performed below the cutting device and on a receiver member.

In the embodiment of the invention illustrated in FIG. 1, thin streams of molten glass are drawn from the apertures in one or more die plates, not shown, in order to produce filaments which are coated with a non-aqueous size which is in the liquid state and can react under the effect of actinic radiation. The filaments are then gathered together to form at least one thread, the thread or threads then being cut by a member which is also used for drawing the fibers, such as an anvil wheel 1 and a blade-carrier wheel 2. The cut threads then fall onto a receiver member 3 such as a moving conveyor which is preferably a metal mat and, as they fall, the threads are subjected to initial irradiation from an ultraviolet radiation source 4 located below the cutting member. They are then subjected to complete radiation from a second source 5 of ultraviolet radiation while on the receiver member before being collected by a collecting member 6.

It should be noted that the initial irradiation of the cut threads enables the size deposited on the threads in question to be pre-crosslinked, which enables the adhesion of the threads to the receiver member to be reduced. In addition, in the case of sizing compositions which are only slightly reactive, this irradiation enables the crosslinking process which the second crosslinking process completes to be started.

Figure 2:
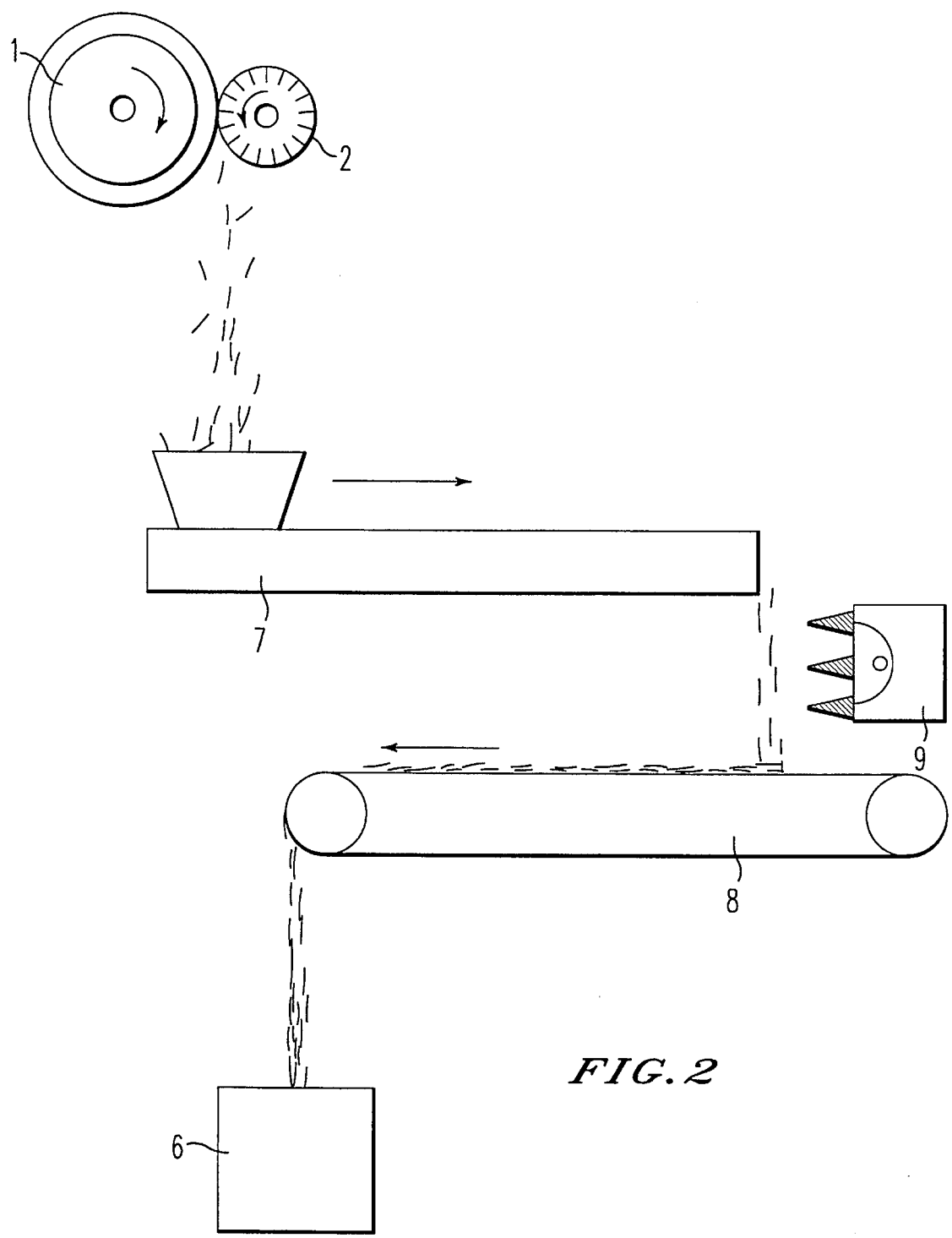
FIG. 2 is a partial, schematic view of a further embodiment of the invention in which the exposure to actinic radiation is performed during transfer from one receiver member to another.

The second embodiment of the prevent invention, illustrated in FIG. 2, is more suitable in the case in which the sizing composition used has greater reactivity.

In this embodiment of the invention, the cut threads are not subjected to initial irradiation below the cutting device. They are firstly collected on a receiver member 7 which is preferably moved by a vibrating motion, such as a vibrating metering mat. They then fall onto a second receiver member such as a moving conveyor 8 and, during this transfer, they are subjected to the effect of actinic radiation from an ultraviolet light source 9.

In this embodiment of the invention, the irradiation process is performed in a single step. Although the irradiation process still operates while the cut threads are falling, the location of the irradiation source is different and does not lead to the same results as those observed in the case of irradiation below the cutting device.

When the threads are subjected to actinic radiation during the transfer from the first receiver member to the second, the threads, which are well-distributed over the first receiver member, owing in particular to the fact that a vibrating mat is used, fall in the form of a screen in front of the irradiation source and at a slow speed, which encourages homogeneous irradiation of the sized threads.

This is not the case with irradiation below the cutting device in which the threads fall freely at a variable distance from the irradiation source and at a higher initial speed and are therefore not all exposed to the same amount of radiation. In the majority of cases, therefore, the irradiation below the cutting device only aims to bring about initial crosslinking while the irradiation during the transfer from one receiver member to another enables total crosslinking to be attained.

Figure 3:
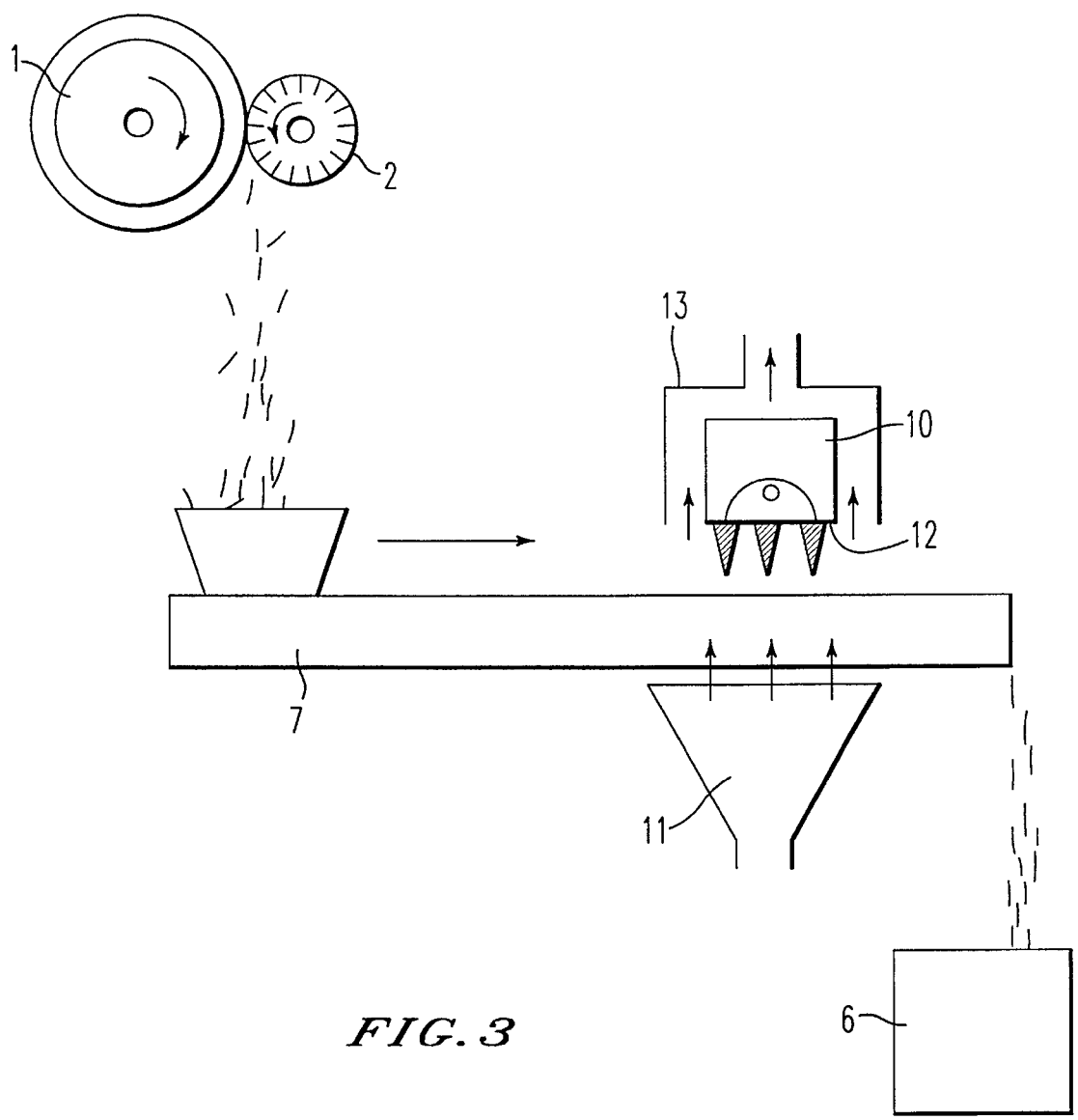
FIG. 3 is a partial, schematic view of a preferred embodiment of the present invention in which the exposure to actinic radiation is performed on a receiver member subject to vibrations and above a blower device.

FIG. 3 illustrates a preferred embodiment of the invention in which the cut threads are collected on a vibrating mat 7, advantageously made of metal and provided with perforations (not shown), and are then subjected to actinic radiation from an ultraviolet light source 10 while they are above a blower member 11. In this case the irradiation source is protected from the blown air by a silica plate 12 and the gaseous currents are evacuated by means of a caisson 13 surrounding the irradiation source as shown by the arrows. The cut threads thus irradiated are then collected by a collecting member 6.

In this embodiment of the invention it may also be possible to gather the cut threads beforehand on a vibrating mat, the threads then falling onto a perforated metal conveyor where irradiation occurs above a blower member.

The process according to the invention enables cut threads to be obtained which have good characteristics of integrity, pourability and compatibility with the matrices to be reinforced.

The following examples illustrate the present invention in a non-exhaustive manner by, indicating in particular sizing compositions which can he used within the scope of this invention and results of dynamic integrity on the resultant cut threads.

EXAMPLE 1

In this example, filaments are formed by drawing thin streams of molten glass from the apertures in a die plate and are coated with the following sizing composition, expressed as weight percentages:

| | |
|---|---|
| acrylate urethane prepolymer marketed by the HARCROS company under the reference Actilane 17 | 16% |
| monofunctional acrylate urethane monomer marketed by the HARCROS company under the reference CL 959 | 23.3% |
| N vinyl pyrrolidone | 17.4% |
| trimethylolpropane triacrylate monomer marketed by the CRAY VALLEY company under the reference SR 351 | 23.3% |
| radical-like photo-initiator marketed by the CIBA-GEIGY company under the reference Irgacure 651 | 5% |
| gama aminopropyltriethoxy silane marketed by the UNION CARBIDE company under the reference Silane A 1100 | 15% |

The filaments sized in this way are then gathered together to form a thread which is cut by a member also used for drawing them. Then the cut threads are collected on a vibrating metal mat and are subjected to ultraviolet radiation while they pass over a blower device.

In order to assess the dynamic integrity of the resultant cut threads, the cut threads in question are mixed with granulates of thermoplastic material and are then rotated for approximately 10 minutes before being recovered and passed onto a vibrating mat. The residual flock is then recovered and weighed in order to establish the corresponding flock content. The integrity is then the greater, the lower this content of flock.

The flock content produced with the cut threads according to this example was 0%.

EXAMPLE 2

In this example, the cut threads are obtained according to the same method as described in example 1, the filaments being coated with the following sizing composition, expressed as weight percentages:

| | |
|---|---|
| acrylate urethane prepolymer marketed by the HARCROS company under the reference Actilane 19 | 24.4% |
| monofunctional acrylate urethane monomer marketed by the HARCROS company under the reference CL 959 | 20.6% |
| N vinyl pyrrolidone | 15.4% |
| trimethylolpropane triacrylate monomer marketed by the CRAY VALLEY company under the reference SR 351 | 20.6% |
| radical-like photo-initiator marketed by the CIBA-GEIGY company under the reference Irgacure 651 | 4% |
| gamma aminopropyltriethoxy silane marketed by the UNION CARBIDE company under the reference Silane A 1100 | 15% |

The flock content obtained with the cut threads prepared according to this example was 3%.

The cut threads obtained according to the present invention are in particular intended for reinforcing thermoplastic or thermosetting resins, reinforcing cement, etc.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A process for manufacturing cut threads, comprising the steps of:
    cutting glass threads composed of continuous filaments, these filaments being coated with a non-aqueous liquid size which can react under actinic radiation; and
    subjecting the cut threads to at least one actinic radiation.

2. The process according to claim 1 including the step of receiving the cut threads on at least one receiver member, wherein said at least one actinic radiation is performed on said threads on said at least one receiver member.

3. The process according to claim 1 including the step of receiving the cut threads on at least one receiver member, wherein said at least one actinic radiation is performed on said threads after the cutting step and before the threads are received on said at least one receiver member.

4. The process according to claim 2 including the step of blowing a gas over said threads on said at least one receiver member during said at least one actinic radiation.

5. The process according to one of claims 2–4 including the step of vibrating said at least one receiver member.

6. The process according to one of claims 1–4 including the step of sequentially receiving said cut threads on first and second receiver members and performing at least one actinic radiation on said threads while said threads are falling from said first receiver member to said second receiver member.

7. The process according to claim 6 including the step of vibrating said first receiver member.

* * * * *

UNITED STATES PATENT AND TRADEMARK OFFICE
CERTIFICATE OF CORRECTION

PATENT NO. : 5,601,882
DATED : FEBRUARY 11, 1997
INVENTOR(S) : ERIC AUGIER ET AL

It is certified that error appears in the above-identified patent and that said Letters Patent is hereby corrected as shown below:

Column 3 line 13, change "in" to --is--.

Column 4, line 15, change "in" to --is--.

Column 4, line 22, change "prevent" to --present--.

Signed and Sealed this

Fourth Day of August, 1998

Attest:

BRUCE LEHMAN

Attesting Officer

Commissioner of Patents and Trademarks